2,824,899

AROMATIC HALONITRO COMPOSITION

Henri Moureu and Paul Chovin, Paris, France, assignors to Societe des Usines Chimiques Rhone-Poulenc, Paris, France, a French body corporate No Drawing. Application June 24, 1957
Serial No. 667,696

1 Claim. (Cl. 260—646)

This invention is for improvements in or relating to chemical compounds and has for its object to provide a new chemical substance possessing useful pharmacological properties.

The compound of the present invention is 5:5′-dinitro-2:2′-dichlorobenzil having the formula:

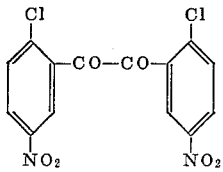

According to a feature of the invention, the new substance is prepared by the nitration of 2:2′-dichlorobenzil which may be obtained, according to the method of H. H. Hodgson and W. Rosenberg (J. Chem. Soc., 1930, 14) i. e. by the oxidation of the corresponding benzoin, itself obtained by the action of potassium cyanide upon o-chlorobenzaldehyde in aqueous alcohol solution. The step of nitration can be effected by means of any of the customary procedures for the introduction of a nitro substituent into an aromatic nucleus, for example, using nitric acid alone, or in a sulphuric or acetic acid medium, or a mixture of an alkali metal nitrate and sulphuric acid.

5:5′-dinitro-2:2′-dichlorobenzil has highly useful pharmacological properties which could not have been predicted from its chemical structure. In particular, it possesses substantial anti-tubercular activity. It can also be employed in veterinary medicine against coccidioses, septicaemias of young animals, refractory purulent endometrites, mammary colibacillosis and brucellosis.

In the following non-limitative example, in which the parts are by weight, there is included a description of the preparation of the starting material by a method which is an improvement over that of the authors referred to above. The melting points are those determined on the Kofler bench.

EXAMPLE

*2:2′-dichlorobenzil* o-Chlorobenzaldehyde (110 parts) is dissolved in 95% v./v. ethanol (175 parts) and a solution of potassium cyanide (22 parts) in water (120 parts) is added. The solution, which is originally light yellow, becomes orange red. The mixture is heated under reflux for one hour and then cooled, a saturated solution of sodium bicarbonate (170 parts) is added and the mixture is extracted with ether (2 x 200 parts).

The ethereal solution is washed with a 10% sodium bisulphite solution (300 parts) and then with water and is dried over anhydrous sodium sulphate.

The ether is then evaporated completely and the gummy residue is oxidised directly.

In order to do this it is treated with acetic acid (200 parts) and the clear solution obtained is transferred to a vessel of three times its volume. An oxidising mixture consisting of ammonium nitrate (46 parts) and crystalline copper acetate (0.5 part) is added and the mixture is heated cautiously until the evolution of nitrogen has moderated and is then heated under reflux for one hour.

On cooling, 2:2′-dichlorobenzil crystallises copiously and is filtered off, washed with acetic acid and dried. There is obtained 2:2′-dichlorobenzil (60 parts), M. P. 130–132° C.

*5:5′-dinitro-2:2′-dichlorobenzil*

Crude 2:2′-dichlorobenzil (100 parts), prepared as above, is suspended, without special precautions, in concentrated sulphuric acid ($d=1.83$; 730 parts). A mixture of concentrated sulphuric acid ($d=1.83$; 440 parts) and fuming nitric acid ($d=1.52$; 120 parts) is added dropwise over ½ hour with mechanical agitation and cooling so that the temperature is maintained between 40° and 45° C. The mixture is then left to attain room temperature, agitation being maintained for 6 hours, and is left to stand overnight. The suspension is then poured on to crushed ice (1500 parts) and the yellow solid which separates is filtered off, dried and washed with distilled water until completely free from sulphate ions. On drying, there is obtained a product (130 parts), M. P. 160° C.

The product may be purified by crystallisation from glacial acetic acid in a proportion of 130 parts of benzil to 800 parts of the solvent. It then melts at 179° C.

5:5′-dinitro-2:2′-dichlorobenzil is a pale yellow crystalline powder insoluble in water and aqueous alkaline solutions and moderately soluble in ethanol and acetic acid.

We claim:

As a new composition of matter 5:5′-dinitro-2:2′-dichlorobenzil of the formula:

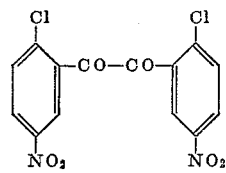

No references cited.